Mar. 20, 1923.

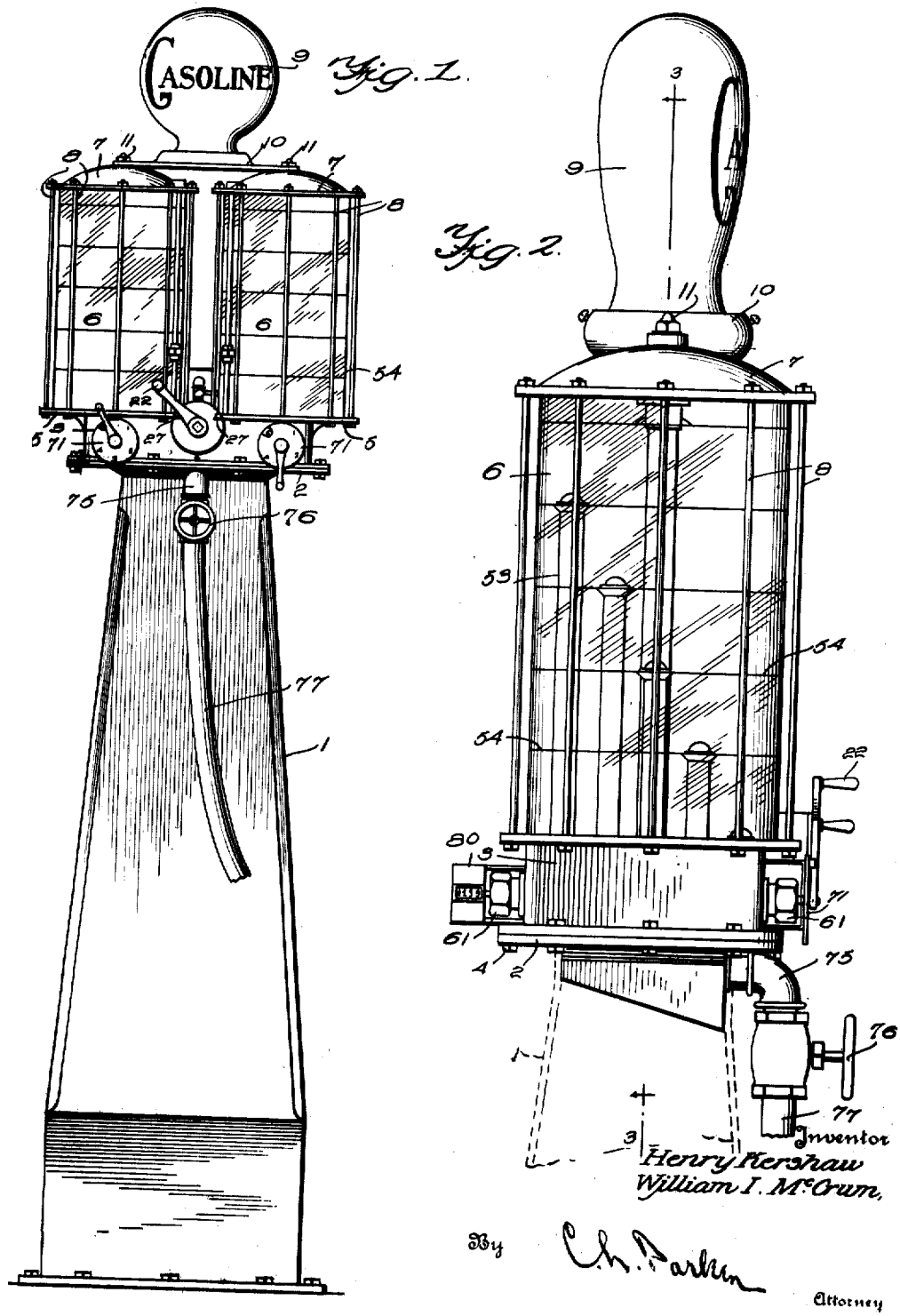

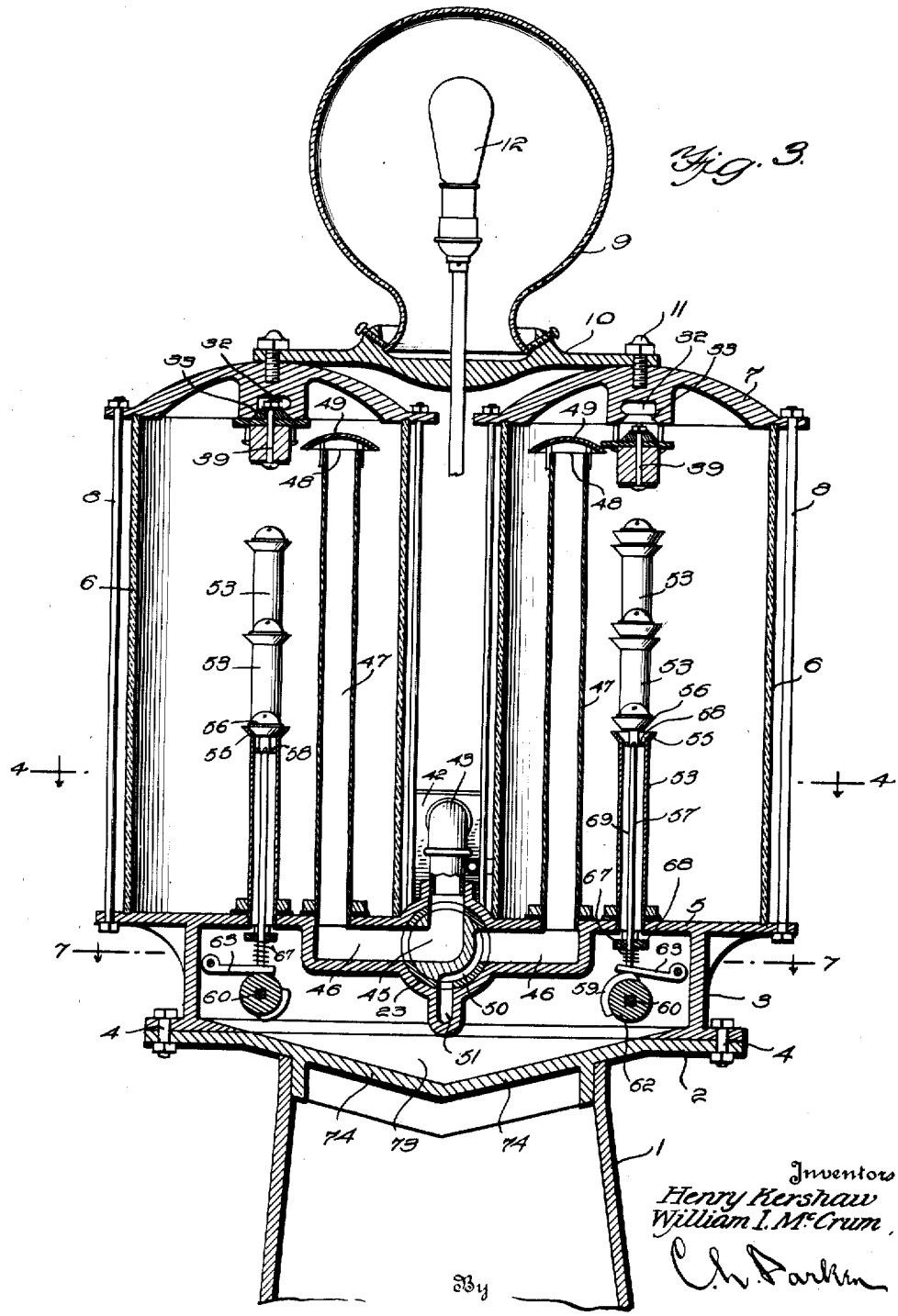

H. KERSHAW ET AL.
LIQUID DELIVERING SYSTEM.
FILED APR. 23, 1921.

1,448,804.

Inventor
Henry Kershaw
William I. McGrum

Attorney

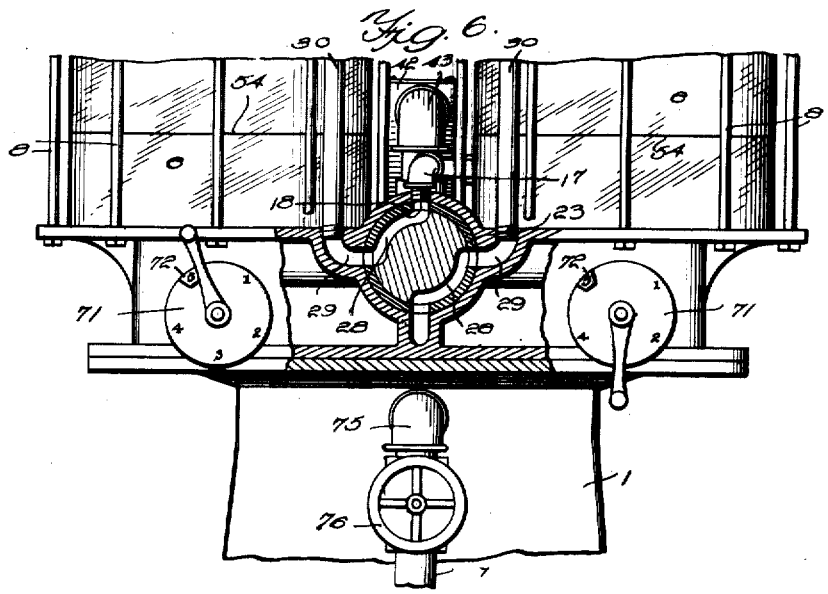
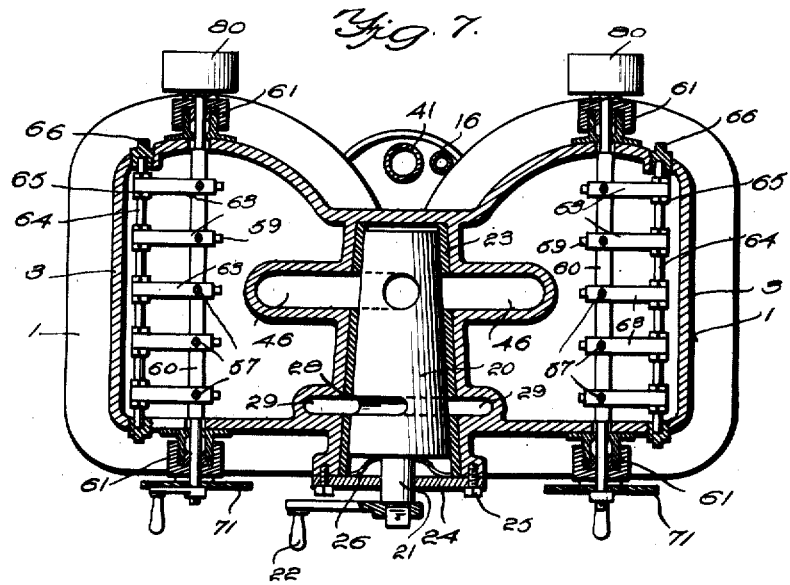

Mar. 20, 1923. 1,448,804.
H. KERSHAW ET AL.
LIQUID DELIVERING SYSTEM.
FILED APR. 23, 1921.
6 SHEETS—SHEET 5.
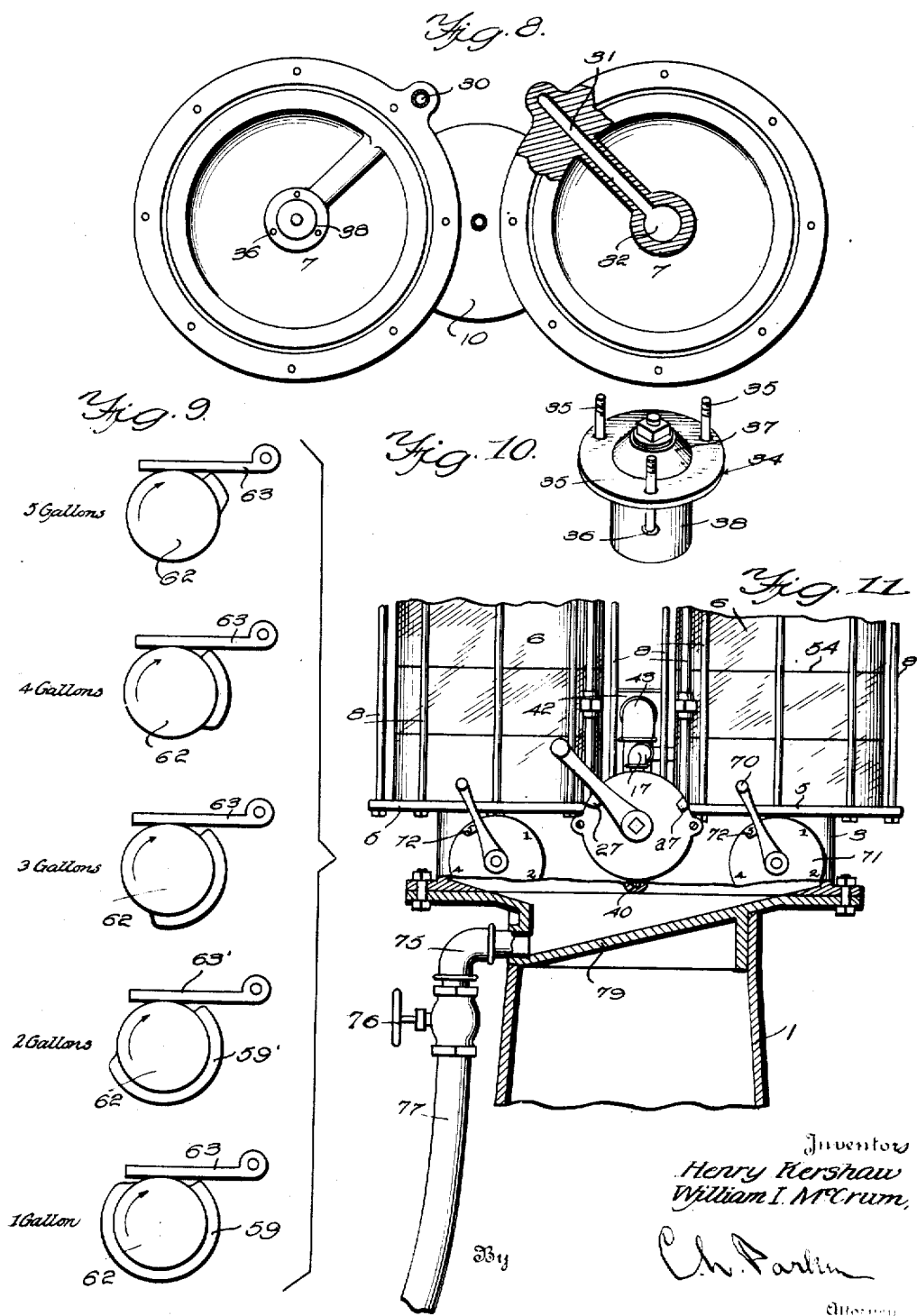

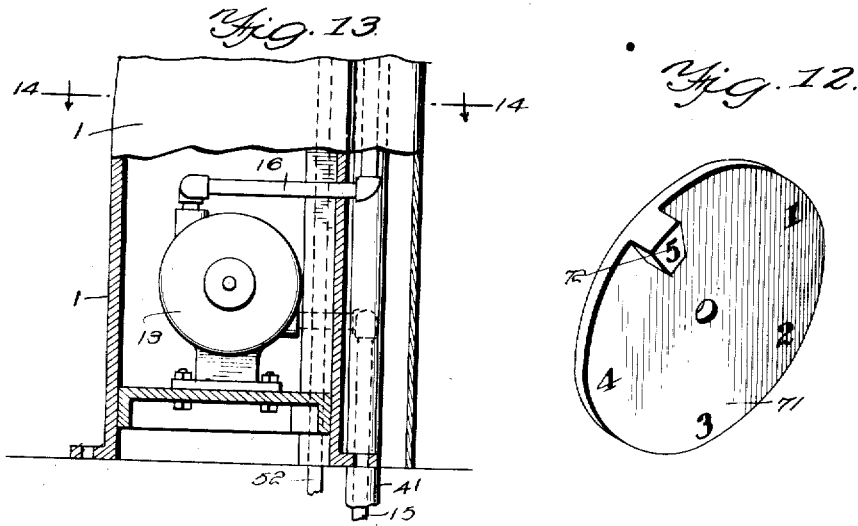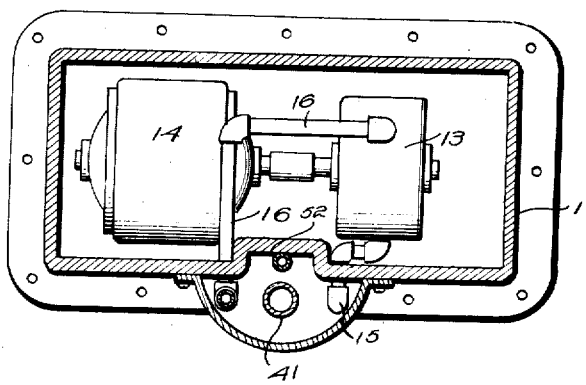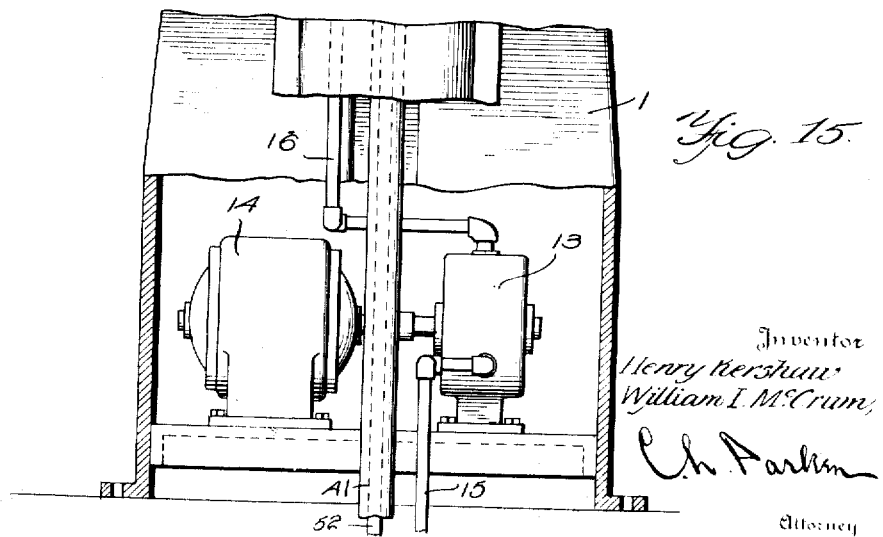

Patented Mar. 20, 1923.

1,448,804

UNITED STATES PATENT OFFICE.

HENRY KERSHAW, OF KEARNEY, AND WILLIAM I. McCRUM, OF NUTLEY, NEW JERSEY, ASSIGNORS TO KERSHAW CORPORATION, OF NEWARK, NEW JERSEY, A CORPORATION OF NEW JERSEY.

LIQUID-DELIVERING SYSTEM.

Application filed April 23, 1921. Serial No. 463,799.

*To all whom it may concern:*

Be it known that we, HENRY KERSHAW and WILLIAM I. McCRUM, a subject of the King of Great Britain and a citizen of the United States, respectively, residing at Kearney, in the county of Hudson, and Nutley, in the county of Essex, and State of New Jersey, respectively, have invented certain new and useful Improvements in Liquid-Delivering Systems, of which the following is a specification.

This invention relates to liquid delivering systems, and it comprises a pair of tanks, means for establishing a vacuum within either of said tanks and connecting the tank to a source of supply, and means for discharging liquid from either of said tanks in predetermined quantities.

In the present invention, we have provided a liquid delivering system, particularly suitable for use in dispensing gasoline or other motor fuel. The liquid delivering apparatus forming the present invention is of the visible measuring type wherein the fuel is delivered to a vessel made of glass or other transparent material to permit the purchaser to see that the correct amount is provided. Generally in types of this sort, a single tank is provided and the fuel is usually drawn into the tank by creating a vacuum therein.

The use of visible measuring apparatus for motor fuel and other liquids has heretofore been accompanied by the disadvantage that it is first necessary to create a vacuum in the tank, then draw the fuel into the tank, and then discharge it. These separate operations require considerable time, and where several purchasers are waiting for the fuel to be dispensed, the delay is inconvenient.

In the present invention, we provide a pair of visible tanks having a control valve by means of which a vacuum may be established in either tank and the fuel drawn in. During the filling operation in one tank, the contents of the other tank may be discharged, and it is thus possible for the apparatus to work practically continuous. To change the filling apparatus from one tank to the other, it is merely necessary to turn a single valve and when the tank becomes filled, the suction pump is automatically cut off by a self-closing valve.

The invention further comprises means for delivering predetermined quantities of fuel from a filled or partially filled tank. A plurality of discharge valves are arranged in each of the tanks, the valves being arranged at various elevations and adapted to deliver the fuel contained in the tank above the level of the valve. The valves are controlled by a single shaft and are consecutively opened from the highest valve to the lowest whereby the entire contents of the tank may be quickly emptied.

In the accompanying drawings, we have shown several embodiments of the invention. In this showing:

Figure 1 is a front elevation of one form of the invention,

Figure 2 is a side view,

Figure 3 is a vertical sectional view on line 3—3 of Figure 2,

Figure 4 is a horizontal sectional view on line 4—4 of Figure 3, showing the discharge valves, Figure 5 is a vertical sectional view on line 5—5 of Figure 4, showing the inlet valve, Figure 6 is a front elevation, parts being shown in section, Figure 7 is a horizontal sectional view on line 7—7 of Figure 3, showing the control mechanism of the discharge valves, Figure 8 is a plan view, parts being shown in section, Figure 9 is a diagrammatic illustration of the discharge valve operating mechanism, Figure 10 is a detail view of the self-closing valve which controls the suction pump, Figure 11 is a detail view showing a modified type of discharge apparatus, Figure 12 is a detail view of an indicator plate arranged on the discharge valve shaft, Figure 13 is a detail view of the suction pump and associated parts, Figure 14 is a horizontal sectional view on line 14—14 of Figure 13, and, Figure 15 is a view of the same parts at right angles to Figure 13.

Referring to the drawings, the reference numeral 1 designates a base or support in the form of a pedestal, upon which the tanks are adapted to be mounted. A base plate 2 is secured to the top of the pedestal, in any suitable manner, and an annular vertical plate 3 is secured thereto by means of bolts 4, or other suitable fastening means. The ring is provided with an upper plate 5, which forms the bottom of the tanks. As shown, each tank comprises a glass cylinder 6, provided with a head 7, the parts being held in position by means of bolts or rods 8, passing through the plate 5 and head 7. A suitable ornamental dome or cover 9 may be arranged above the heads 7. As shown, the dome is secured to a plate 10, which is in turn secured to the heads by means of bolts 11. An electric lamp 12, or other suitable lighting apparatus, may be arranged within the bottom for the purpose of illumination at night.

A suction pump 13 is arranged within the base or pedestal 1, the pump being driven by an electric motor 14, the control switch of which may be arranged at any convenient point. The pump is provided with an outlet pipe 15, which may discharge into the atmosphere or into the fuel tank (not shown) to return vapors to the tank. The inlet side of the pump is connected to a pipe 16 which extends upwardly to a point above the bottom of the tanks or vessel 6. This pipe is connected to a horizontal pipe 17 (see Figure 4) which in turn, communicates with an opening 18, in an inlet valve casing 19 which, as shown, is arranged between the two vessels. The inlet valve casing is substantially conical in shape, and is adapted to receive a conical valve 20, having a valve stem 21, to which an operating handle 22 may be secured. The valve 20 is surrounded by a sleeve 23, made of brass or other suitable material to prevent leakage. A plate 24 is arranged at the front of the valve casing, being secured thereto by suitable fastening means, as at 25, and a spring 26 is arranged between this plate and the head of the valve to maintain the valve in closed engagement with its seat (see Figure 7). The plate 24 may be provided with a pair of stops 27, adapted to engage the operating handle to limit the movement of the valve in either direction. The valve is provided with a pair of ports 28 arranged in the same vertical plane and in the plane of the opening 18 in the valve casing, and positioned substantially opposite each other. The ports 28 are adapted to establish communication between the opening 18 and openings 29 arranged at each side of the valve. Vertical pipes 30 are arranged in the openings 29, and these pipes extend upwardly to the top of the measuring vessels (see Figure 8). The upper ends of the pipes 30 communicate with passages 31, extending through the head of the vessel, and provided with an outlet chamber 32. A valve seat 33 is formed in the outlet chamber adapted to receive a self-closing valve 34. The valve is supported from the head by means of bolts or rods 35, adapted to be secured in the head and made of sufficient length to permit the valve to assume an open position. The rods are provided with heads 36, and these rods are arranged in openings in the valve, the openings being of smaller size than the heads of the bolts to prevent displacement. The valve is provided with a substantially conical portion 37, which is made of any suitable material, such as leather, or a suitable compound adapted to form a gas tight fit on the valve seat 33. The valve is further provided with a cork float 38, secured thereto by a bolt 39, and adapted to ride or float on the liquid in the tank when the tank becomes filled. With the inlet valve 20 in the position shown in the drawings, communication is established between the suction pump and the left hand tank to form a vacuum or partial vacuum within the tank. It will be apparent that if the tank is placed in communication with a source of liquid, the liquid will be drawn into the tank. When the valve is in position to connect one of the tanks to the inlet pump through the passage 28 of the valve, the other passage 28 of the valve communicates with a vent or outlet passage 40 to permit entrance of air into the other vessel through the pipe 30, and thus permit discharge of liquid retained therein.

The connection between the tank that is in communication between the suction pump and the source of supply is also controlled by the inlet valve 20, a single operation of the valve connecting the tank to the suction pump and to the source of supply so that liquid will be delivered thereto. As shown, a delivery pipe 41 communicates with a tank or other source of supply (not shown) generally arranged below the delivering apparatus. The upper end of this pipe communicates with a chamber 42, having a sheet of wire fabric 43, or other similar material arranged therein, to drain water or other foreign matter from the fuel and return it to the source of supply. The chamber 42 is provided with an outlet pipe 43, communicating with an opening 44 in the valve casing. The valve is provided with a passage 45, adapted to establish communication between the opening 44 and either of two passages 46, the passages 46 communicating with vertical pipes 47 arranged within each of the tanks, the pipes being provided with open ends 48 which may be covered by spaced plates 49 to prevent splashing. With the valve in the position shown in the drawings, the source of supply and the suction pump are both in communication with the tank shown to the left, and fuel is being delivered thereto. When the tank becomes filled, the cork float 38, secured to the valve 34, is raised and engages the valve seat 33, to disengage the tank from the suction pump and thus cut off the delivery of fuel thereto. During the filling of one tank, any gasoline or other liquid contained in the pipe 47 of the other tank drains backwardly and passes through a passage 50 in the valve, arranged in the same plane with the port or passage 45. This passage communicates with the drain or outlet chamber 51, connected to an overflow pipe 52 whence it is returned to the source of supply.

Means are provided for delivering predetermined quantities of fuel from either tank. The discharge mechanism is independent of the filling mechanism and one of the measuring vessels may be emptied while the other is being filled, to permit continuous operation. As shown, a plurality of stand pipes 53 are arranged in each of the vessels, the pipes being of different lengths and terminating at different elevations. The length of the pipes are such that a predetermined quantity of fuel will be delivered from the tank when the valve arranged in any pipe is opened. In the present disclosure, the pipes are so arranged that units of one or more gallons will be delivered when the different valves are open. As shown, the glass cylinder 6 may be provided with suitable indicating marks, 54, arranged at different elevations in alinement with the top of the pipes 53. Each of the pipes 53 is provided with a flared end 55 forming a valve seat and a valve 56 is mounted on a valve rod 57 arranged within the pipe and adapted to normally close the opening in the pipe. As shown, a spider 58 may be arranged on the rod adapted to engage the wall of the pipe to prevent play in the valve. The valves are operated by cams 59, arranged on a valve operating rod or shaft 60. Referring to Figure 7 of the drawings, the shaft extends through the vertical wall of the ring 3 at the front and back and is provided with suitable packing glands 61. Within the casing, a roll 62 is arranged on the shaft, the roll being provided with a squared opening for the reception of the shaft whereby the roll is revolved and the cams 59 are carried thereon. These cams are adapted to engage rocker arms 63, mounted on a shaft 64. The arms are retained in proper position with respect to the corresponding valve by means of collars 65. The ends of the shafts 64 are mounted in suitable bearings 66. The rocker arms are adapted to engage the lower ends of the valve stems 57 and a spring 67 is arranged on each of the valve rods to maintain the rocker arm in engagement with the roller or cam. A plate 68 is arranged below the bottom of the measuring vessel to form a guide for the valve stems. This plate is spaced from the bottom of the casing by means of bushings 69 arranged between the openings at the bottom of the stand pipes.

Referring to Figure 9 of the drawings, the cams 59 are of different sizes whereby different cams will be brought into engagement as the shaft 60 is revolved to open different valves. When the valve on the longest of the stand pipes terminating adjacent the top of the casing is opened, one gallon of gasoline will be delivered from the tank, as shown. Further revolution of the shaft will bring a second cam 59' into engagement with a corresponding rocker arm to open the valve in the next lower pipe, and the valves are consecutively opened until, when the shaft has been turned practically a whole revolution, the lowermost valve is opened and the entire contents of the measuring vessel emptied. The shaft is provided with an operating handle 70, and a plate 71 is arranged in front of the casing, the plate being provided with suitable indications to show which valves have been opened and how much fuel is being delivered. As shown, a projection 72 may be arranged on the plate to limit further movement of the handle when all of the valves have been opened.

When the gasoline or other liquid is delivered from the measuring vessel or tank, it flows into a trough 73, formed by the base plate 2. In the form of the invention shown in Figures 1 and 2 of the drawings, the walls of the base plate slope toward the center, as at 74, and a delivery nozzle or outlet 75 is provided, having a valve 76 therein and adapted to be connected to a hose 77. The bottom walls of the trough also slope from the rear to the front, as indicated at 78, in Figure 5 of the drawings, whereby all the fuel delivered from the measuring vessel will pass through the outlet 75. In the form of the invention shown in Figure 11 of the drawings, the outlet 75 is connected at the side of the delivering apparatus, at the lowest point, the trough sloping as indicated at 79.

In operation, with the parts in the position shown in the drawings, the suction pump 13 is connected to the left hand tank through the medium of pipe 16, pipe 17 passage 28, opening 29 and pipe 30. With the valve arranged to connect the suction pump to this tank, the delivery pipe 41 is also connected to the same tank through the passage 45 of the valve and the pipe 47 arranged in the tank. Due to the suction, the fuel will be continually drawn into the tank until the level reaches a point near the top when the float valve 34 will be raised to close the vacuum chamber 32 and cut off the suction.

While the tank is being filled, the right hand tank is in communication with the atmosphere through the vent opening 40, and the other passage 28 of the valve to permit air to flow into the tank to replace fuel drawn therefrom. At the same time, the pipe 47 is in communication with the overflow pipe or drain pipe 52 by means of the passage 50 in the valve and any fuel in pipe is returned to the source of supply.

The fuel contained in the right hand tank may be delivered to the discharge pipe 75 while the left hand tank is being filled. If the entire contents of the tank are to be emptied, the handle 70 is turned until it engages the projection 72, bringing all of the cams 59 into engagement with the corresponding rocker arms 63, and opening all of the valves 56. If an amount of fuel less than the entire contents of the measuring vessel 6 is desired, the handle is turned a fraction of a revolution, the amount it is to be turned being judged by the indications on the plate 71. When the plate is turned a fraction of a revolution, one or more of the valves 56 are opened and the fuel contained in the tank above this valve is delivered to the outlet pipe.

As shown, a suitable counter 80 may be arranged on each of the shafts 60, to keep a record of the fuel dispensed.

It is to be understood that the forms of our invention herewith shown and described are to be taken as preferred examples of the same, and that various changes in the shape, size, and arrangement of parts may be resorted to without departing from the spirit of the invention or the scope of the subjoined claims.

Having thus described our invention, we claim:

1. A fuel delivering system comprising a pair of tanks, suction producing means, a fuel supply pipe, a pair of pipes communicating with the interior of each of said tanks, and a valve arranged to simultaneously connect one pipe of either of said pairs of pipes to the suction producing means and the other pipe of said pair of pipes to the supply pipe.

2. A fuel dispensing apparatus comprising a pair of tanks, a pair of pipes communicating with the interior of each of said tanks, a valve casing arranged between said tanks, suction producing means communicating with said valve casing, a fuel supply pipe communicating with said valve casing, and a valve arranged in said casing adapted to simultaneously connect one pipe of either of said pairs of pipes to the suction producing means and the other pipe of said pair of pipes to the fuel supply pipe.

3. A fuel dispensing apparatus comprising a pair of tanks, a valve casing arranged between said tanks, suction producing means communicating with said valve casing, a fuel supply pipe communicating therewith, a drain pipe communicating with the valve casing in the plane of the fuel supply pipe, and a valve arranged in said casing adapted to connect either of said tanks to the suction producing means and the fuel supply pipe and to connect the other tank to the drain pipe.

4. The combination with a pair of measuring vessels and a source of liquid supply, of a valve casing arranged between said vessels and connected to said source of supply, a valve arranged in said casing having a port to permit communication between the source of supply and either of said vessels, an overflow pipe connected to said valve casing and to said source of supply, said valve being provided with a second port in the plane of the first port to connect the other tank to the overflow pipe, suction producing means, and means controlled by said valve to connect the tank which is in communication with the source of supply to said suction producing means.

5. The combination with a pair of measuring vessels, a source of liquid supply, and suction producing means, of a valve casing connected to said source of supply and said suction producing means, means for connecting said valve casing to each of said tanks to create a vacuum therein, separate connecting means for delivery of fuel thereto, and a single control valve to simultaneously establish communication between one of said tanks and said source of supply and said suction producing means.

6. The combination with a pair of measuring vessels, a source of liquid supply and suction producing means, of a valve casing arranged between said vessels and connected to said source of supply and said suction producing means, each of said vessels being provided with a pair of connections to said valve casing, a valve arranged in said casing, said valve being provided with ports to permit communication between said source of supply and one of said connections and between said suction producing means and the other of said connections to deliver fuel to either of said tanks, and an automatically operating valve to close said suction producing means when the liquid reaches a predetermined height in the vessel.

In testimony whereof we affix our signatures in presence of two witnesses.

HENRY KERSHAW.
WILLIAM I. McCRUM.

Witnesses:
IRVING W. TEEPLE,
W. J. CASSIDY.